(12) United States Patent
Iwaki et al.

(10) Patent No.: US 10,414,237 B2
(45) Date of Patent: Sep. 17, 2019

(54) DUMP TRUCK PITCHING CONTROL SYSTEM

(71) Applicant: HITACHI CONSTRUCTION MACHINERY CO., LTD., Tokyo (JP)

(72) Inventors: Takeshi Iwaki, Tsuchiura (JP); Atsushi Kitaguchi, Tsuchiura (JP); Kazunori Ishihara, Tsuchiura (JP); Jun Ikeda, Tsuchiura (JP); Yoshifumi Nabeshima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 3 days.

(21) Appl. No.: 15/756,241

(22) PCT Filed: Sep. 15, 2016

(86) PCT No.: PCT/JP2016/077233
§ 371 (c)(1),
(2) Date: Mar. 6, 2018

(87) PCT Pub. No.: WO2018/051452
PCT Pub. Date: Mar. 22, 2018

(65) Prior Publication Data
US 2019/0023098 A1    Jan. 24, 2019

(51) Int. Cl.
*G06F 19/00*    (2018.01)
*B60G 17/04*    (2006.01)
(Continued)

(52) U.S. Cl.
CPC ........ *B60G 17/0416* (2013.01); *B60G 11/265* (2013.01); *B60G 17/0155* (2013.01);
(Continued)

(58) Field of Classification Search
USPC .............................................. 701/22, 50, 55
See application file for complete search history.

(56) References Cited

U.S. PATENT DOCUMENTS

| | | | |
|---|---|---|---|
| 2007/0135985 A1* | 6/2007 | Berry | E02F 9/2029 701/50 |
| 2008/0282583 A1* | 11/2008 | Koellner | E02F 3/304 37/348 |
| 2012/0072084 A1* | 3/2012 | Stoller | F16H 61/472 701/55 |

(Continued)

FOREIGN PATENT DOCUMENTS

| | | |
|---|---|---|
| JP | 05-077629 A | 3/1993 |
| JP | 3006088 B2 | 2/2000 |

(Continued)

*Primary Examiner* — Masud Ahmed
(74) *Attorney, Agent, or Firm* — Mattingly & Malur, PC

(57) ABSTRACT

A dump truck pitching control system that can improve the ride quality of a vehicle body and the drive stability during traveling is provided. The present invention includes: a pitching state amount detection section 194 that detects a state amount of the pitching movement of the vehicle body 10; a spring characteristics calculation section 197 that calculates spring characteristics of suspension cylinders 30, based on detection results of stroke sensors 306, pressure sensors 307, and temperature sensors 308; a pitching target amount calculation section 192 that calculates a target amount of the pitching movement of the vehicle body 10, according to the spring characteristics calculated by the spring characteristics calculation section 197; and a torque correction value calculation section 193 that calculates a torque correction value required to correct the pitching amount, according to the spring characteristics calculated by the spring characteristics calculation section 197.

3 Claims, 10 Drawing Sheets

(51) Int. Cl.
*B60W 40/12* (2012.01)
*B60L 15/20* (2006.01)
*B60W 30/02* (2012.01)
*B60G 17/015* (2006.01)
*B60G 11/26* (2006.01)

(52) U.S. Cl.
CPC .......... *B60G 17/0424* (2013.01); *B60L 15/20* (2013.01); *B60W 30/02* (2013.01); *B60W 40/12* (2013.01); *B60G 2202/15* (2013.01); *B60G 2300/026* (2013.01); *B60G 2400/208* (2013.01); *B60G 2400/252* (2013.01); *B60G 2400/51222* (2013.01); *B60G 2400/7122* (2013.01); *Y02T 10/7275* (2013.01)

(56) References Cited

U.S. PATENT DOCUMENTS

| | | | |
|---|---|---|---|
| 2013/0116874 A1* | 5/2013 | Ichinose | B60L 7/18 |
| | | | 701/22 |
| 2014/0084831 A1* | 3/2014 | Kawaguchi | E02F 9/123 |
| | | | 318/434 |
| 2016/0348340 A1* | 12/2016 | Kaneta | E02F 9/123 |

FOREIGN PATENT DOCUMENTS

| | | |
|---|---|---|
| JP | 2009-040163 A | 2/2009 |
| JP | 2010-012835 A | 1/2010 |
| JP | 2010-142058 A | 6/2010 |

* cited by examiner

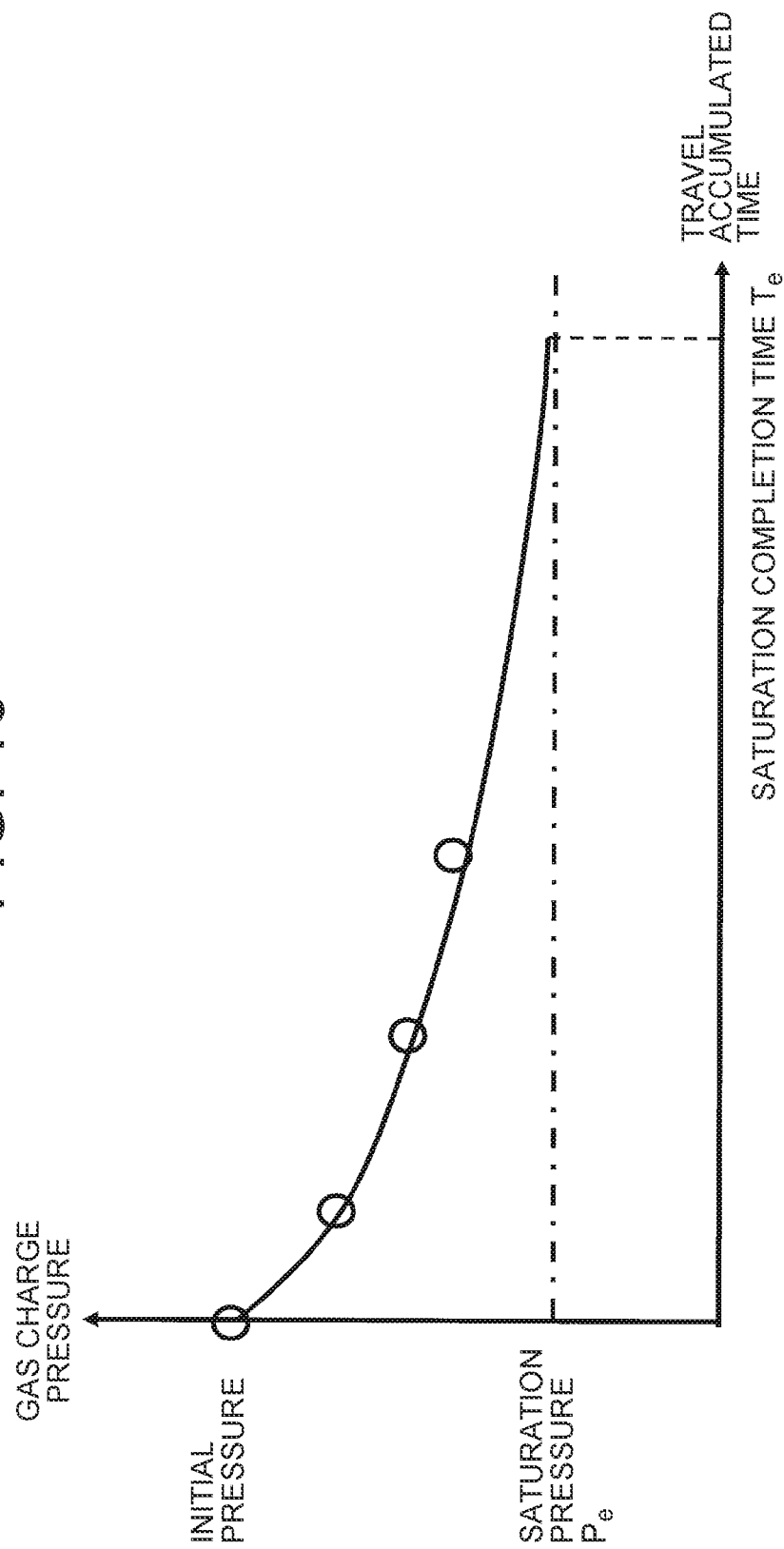

ived from the mines, etc., or earth and sand, etc., as a load includes a frame; front wheels rotatably provided at a front part of the frame; rear wheels rotatably provided at a rear part of the frame; a vessel that is provided to be liftable from the frame and is to be loaded with the load; and left and right pairs of suspension cylinders that intervene between the frame and the front wheels and rear wheels and hold the vehicle body while absorbing vibrations from the road surface during traveling and alleviating shocks to the vehicle body.

DUMP TRUCK PITCHING CONTROL SYSTEM

TECHNICAL FIELD

The present invention relates to a dump truck pitching control system that controls pitching movement of a dump truck.

BACKGROUND ART

Typically, a dump truck that conveys minerals mined from mines, etc. or earth and sand, etc. as a load includes: a frame; front wheels rotatably provided at a front part of the frame; rear wheels rotatably provided at a rear part of the frame; a vessel that is provided to be liftable from the frame and is to be loaded with the load; and left and right pairs of suspension cylinders that intervene between the frame and the front wheels and rear wheels and hold the vehicle body while absorbing vibrations from the road surface during traveling and alleviating shocks to the vehicle body.

The dump truck includes the vessel that is provided to be liftable on the frame and is to be loaded with a load, such as earth and sand and gravel, a hinge pin provided at the rear part of the frame, and hoist cylinders that are arranged on the frame more frontward than the hinge pin and couples the frame and the vessel to each other. The dump truck can dump the load from the vessel by extending the hoist cylinders to push the vessel upward and raise this vessel.

The vehicle weights of the dump truck having such a configuration in cases with and without the load are different by two-fold or more. Consequently, use of suspension cylinders having linear spring characteristics largely changes the vehicle height in the cases with and without the load. Accordingly, the suspension cylinders of the dump truck are required to have nonlinear spring characteristics that the harder, the stiffer the cylinders become. Furthermore, since the own weight of the dump truck and the carrying load of the vessel are significantly large, the holding force characteristics capable of holding the weight and load are also required.

According to the above reasons, suspension cylinders in which gas and oil are seamlessly enclosed are included in the dump truck in order to achieve the nonlinear spring characteristics and exert a large holding force. The suspension cylinder having such a configuration has a double spring structure where gas and oil are compressed by receiving an external force. As one of conventional arts of spring structures of such a type, a fluid pressure type active suspension has been known (e.g., see Patent Literature 1).

When the dump truck accelerates and decelerates and goes over obstacles, the suspension cylinders are extended and retracted. There is a problem in that the extension and retraction cause the movement of the vehicle body oscillating forward and rearward, that is, a pitching movement, which changes the attitude of the vehicle body during traveling. As one conventional art to solve the problem, a vehicle body attitude control device has been proposed that prevents the vehicle body from rising during curving travel by distributing the downforce, which is in proportion to the lateral acceleration, to oil hydraulic suspension mechanisms for front and rear axle wheels and by applying the distributed forces (e.g., see Patent Literature 2).

CITATION LIST

Patent Literature

Patent Literature 1: Japanese Patent Laid-Open No. 5-77629
Patent Literature 2: Japanese Patent No. 3006088

SUMMARY OF INVENTION

Technical Problem

As described above, gas and oil are seamlessly enclosed in the suspension cylinders used for the dump truck. Accordingly, as described in Patent Literature 1, the gas in the suspension is dissolved into the oil, and this dissolution sometimes changes the spring characteristics of suspension cylinders. It has been known that the dissolution of the gas into the oil occurs after the gas is charged into the suspension cylinders at the first time, and repetitive extension and retraction cause saturation at a certain pressure. It has been known that the spring characteristics of suspension cylinders are changed not only by dissolution of gas into oil but also by change in temperature in the suspension cylinders.

Unfortunately, the conventional art of Patent Literature 2 does not consider the spring characteristics of the suspension cylinders described above, and controls the attitude of the vehicle body using preset spring characteristics. In a case of application of the conventional art of Patent Literature 2 to a dump truck, occurrence of dissolution of gas into oil and variation in temperature in the suspension cylinders prevents the control oil quantity for the suspension cylinders from being correctly obtained. Accordingly, intended control for the attitude of the vehicle body cannot be achieved. It is thus concerned that the ride quality of the vehicle body and the drive stability during traveling cannot be sufficiently achieved.

The present invention has been made in view of actual situations of such a conventional art, and has an object to provide a dump truck pitching control system that can improve the ride quality of the vehicle body and the drive stability during traveling.

Solution to Problem

To achieve the object described above, a dump truck pitching control system of the present invention is a dump truck pitching control system applied to a dump truck including: a rear wheel drive device including at least one motor; and four suspensions including respective four suspension cylinders in which gas and oil are enclosed and which alleviate shocks to a vehicle body during traveling and couple front, rear, left and right wheels to the vehicle body, the system controlling a pitching movement of the vehicle body, and including: a pitching state amount detection section that detects a state amount of the pitching movement of the vehicle body; a stroke sensor that detects strokes of the suspension cylinders; a pressure sensor that detects pressures in the suspension cylinders; a temperature sensor that detects temperatures in the suspension cylinders; a spring characteristics calculation section that calculates spring characteristics of the suspension cylinders, based on detection results of the stroke sensor, the pressure sensor, and the temperature sensor; a pitching target amount calculation section that calculates a target amount of the pitching movement of the vehicle body, according to the spring characteristics calculated by the spring characteristics calculation section; and a torque correction value calculation section that calculates a torque correction value required to correct the pitching amount, according to the spring characteristics calculated by the spring characteristics calculation section, wherein the torque correction value calculation section calculates the torque correction value according to a difference between a state amount of the pitching movement of the vehicle body detected by the pitching state amount detection section and the target amount of the pitching movement of the vehicle body calculated by the pitching target amount calculation section, and outputs the calculated torque correction value, and the rear wheel drive device receives an output of the torque correction value calculation section, and increases and reduces a drive torque.

Advantageous Effects of Invention

The dump truck pitching control system of the present invention can improve the ride quality of the vehicle body and the drive stability during traveling. Problems, configurations and advantageous effects other than those described above can be clarified by the following description of embodiments.

BRIEF DESCRIPTION OF DRAWINGS

FIG. 10 is a diagram showing the relationship between a gas charge pressure and a travel accumulated time obtained by a relationship obtaining section shown in FIG. 8.

DESCRIPTION OF EMBODIMENTS

Embodiments of implementing dump truck pitching control systems according to the present invention are hereinafter described with reference to the drawings.

First Embodiment

Figure 1:
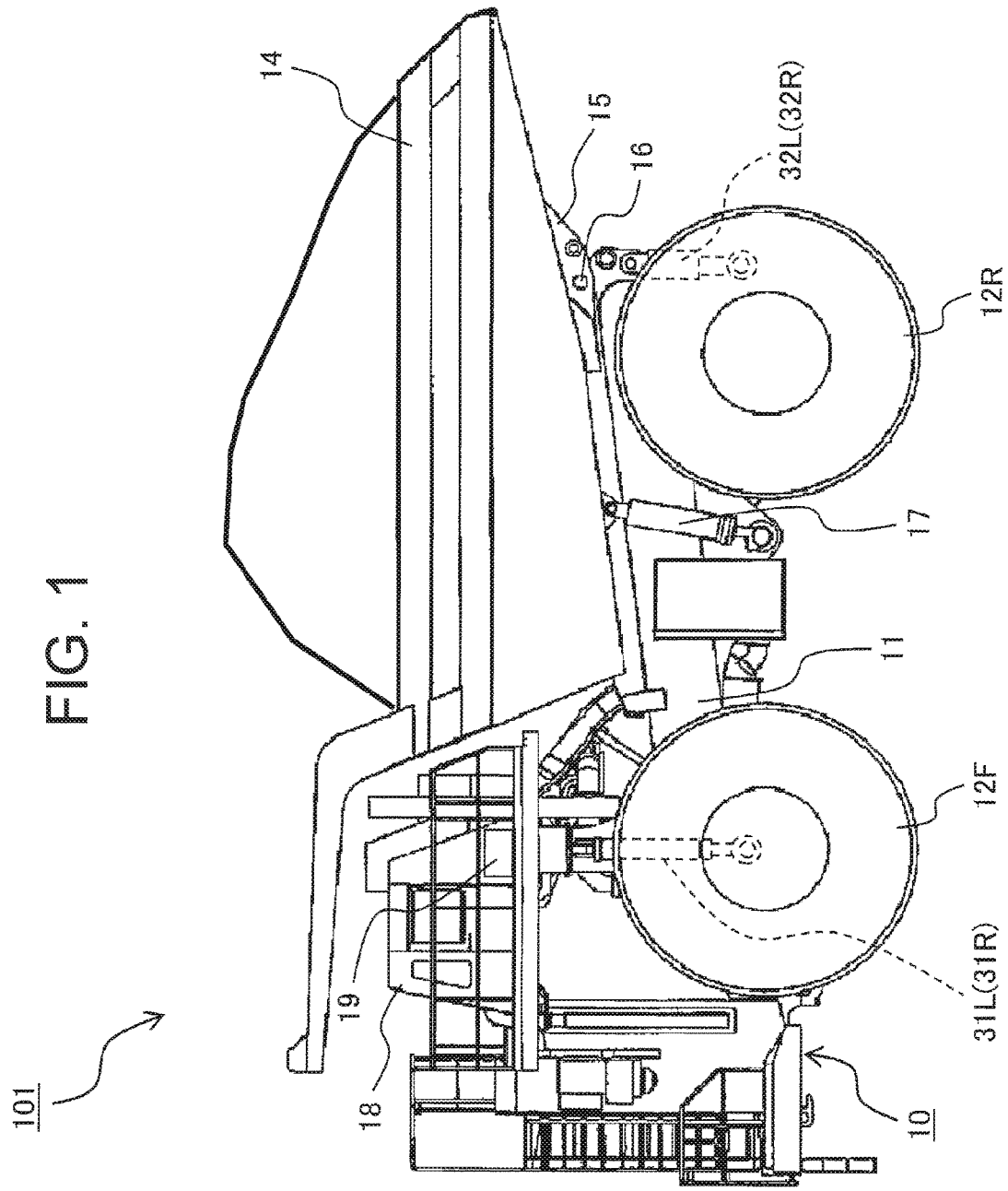
FIG. 1 is a side view showing a configuration of a dump truck to which a pitching control system according to a first embodiment of the present invention is applied.

A pitching control system according to a first embodiment of the present invention is applied to a dump truck 101 shown in FIG. 1, for example. The dump truck 101 includes a frame 11 that forms the framework of a lower part of a vehicle body 10, front wheels 12F respectively arranged one by one at the left and right ends of a front part of the frame 11, and rear wheels 12R respectively rotatably arranged two by two at the left and right ends of a rear part of the frame 11.

The front wheels 12F are wheels to be steered on the basis of the steering angle input through an after-mentioned operation handle or the like, and are follower wheels that follow the rear wheels 12R via the road surface of a travel road on which the dump truck 101 travels. In proximity to the front wheel 12F, a vehicle speed sensor 12A (see FIG. 3) that detects the rotational speed of the front wheel 12F, i.e., the speed of the vehicle body 10 is provided. A detected value of the vehicle speed sensor 12A is output to a controller 19 described later.

Meanwhile, the rear wheels 12R are drive wheels where the drive force of an engine (not shown) internally mounted on the vehicle body 10 is converted into rotational movement to achieve driving. A rear wheel drive device 13 (see FIG. 3) that includes motors (not shown) for driving the rear wheels 12R is attached to such a rotational axle of the rear wheels 12R.

The dump truck 101 includes: a vessel 14 that is provided to be liftable on the frame 11 and is to be loaded with a load, such as earth and sand and ores; a hinge pin 16 provided at a rear part of the frame 11 via a bracket 15; hoist cylinders 17 that are arranged on the frame 11 more frontward than the hinge pin 16 and couples the frame 11 and the vessel 14 to each other; a cab 18 that is disposed more frontward than the vessel 14 and is arranged on the frame 11 on a front wheel 12F side; and a controller 19 that is provided on a side of the cab 18 and controls the operation of the vehicle body 10.

A shift lever (not shown) that is connected to the controller 19 and switches the travel state of the vehicle body 10 to any one of forward (F), neutral (N) and rear (R), an operation handle (not shown) that switches the steering direction of the front wheels 12F to change the traveling direction of the vehicle body 10 to the left and right directions, an accelerator pedal 21 (see FIG. 3) that accelerates the vehicle body 10, and a brake pedal 22 (see FIG. 3) that applies braking forces to the rear wheels 12R, are arranged in the cab 18.

Here, the dump truck 101 is different from a normal passenger vehicle, such as an automobile, in that the weight of the vehicle body 10 in the case with a load mounted on the vessel 14 is changed from the weight of the vehicle body 10 in the case with no load on the vessel 14 by two-fold or more. In order not to change largely the vehicle height of the dump truck 101 in the case with a load with reference to the vehicle height in the case with no load, the dump truck 101 is provided with two front wheel suspensions that include front wheel suspension cylinders 31L and 31R in which typically gas 301 (see FIG. 2) and oil 302 (see FIG. 2) are seamlessly enclosed (only the left front wheel suspension cylinder 31L is shown in FIG. 1), and two rear wheel suspensions that include rear wheel suspension cylinders 32L and 32R (only the left rear wheel suspension cylinder 32L is shown in FIG. 1).

Front wheel suspension cylinders 31L and 31R are arranged left and right in the width direction of the vehicle body 10, intervene between the frame 11 and the front wheels 12F, and have a function of supporting the cab 18, the vessel 14 and a heavy object, such as a load, on this vessel 14 and of alleviating shocks to the vehicle body 10 during traveling.

Likewise, rear wheel suspension cylinders 32L and 32R are arranged left and right in the width direction of the vehicle body 10, intervene between the frame 11 and the rear wheels 12R, and have a function of supporting the cab 18, the vessel 14 and the heavy object, such as the load, on this vessel 14 and of alleviating the shocks to the vehicle body 10 during traveling. In the following description, the front wheel suspension cylinders 31L and 31R and the rear wheel suspension cylinders 32L and 32R are each described as a suspension cylinder 30 in a case where these cylinders are not discriminated from each other.

Next, the configuration of the suspension cylinder 30 according to the first embodiment of the present invention is described with reference to FIG. 2.

Figure 2:
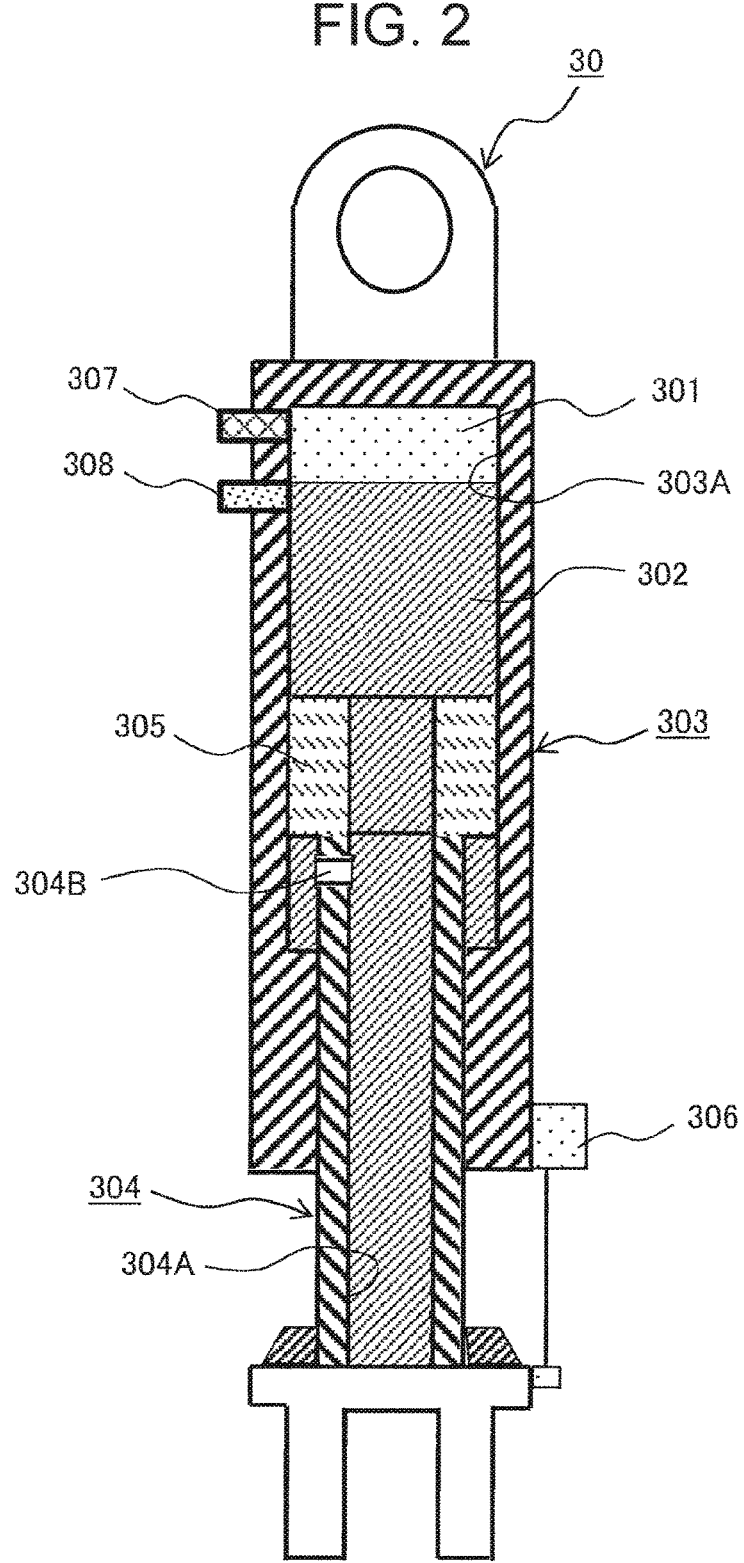
FIG. 2 is a diagram showing a configuration of a suspension cylinder shown in FIG. 1.

As shown in FIG. 2, the suspension cylinder 30 includes: a tube 303 with a fluid chamber 303A located on an inner side thereof in which the gas 301 and the oil 302 are enclosed; a rod 304 which is slidably inserted in the tube 303 and in which a flow path 304A for the oil 302 communicating with the fluid chamber 303A of the tube 303 is internally formed; and a piston 305 which is slidably inserted in the tube 303 and is attached to a base end of the rod 304.

The suspension cylinder 30 having such a configuration has a double spring structure that allows the gas 301 and the oil 302 to be compressed by receiving an external force. The rod 304 is provided with an aperture 304B along a direction perpendicular to the axis of this rod. A pressure loss of the oil 302 passing through the aperture 304B attenuates the vibrations of the suspension cylinder 30.

The suspension cylinder 30 includes: a stroke sensor 306 that is attached to the outside of the end of the opening of the tube 303 and detects the stroke of the piston 305 and the rod 304 with respect to the tube 303; a pressure sensor 307 that is attached onto the fluid chamber 303A side of the tube 303 and detects the pressure in the tube 303; and a temperature sensor 308 that is attached onto the fluid chamber 303A side of the tube 303 and detects the temperature in the tube 303.

Although not shown, the controller 19 is, for example, made up of hardware including: a CPU (Central Processing Unit) that performs various calculations for controlling the entire operation of the vehicle body 10; storing devices, such as ROM (Read Only Memory) and an HDD (Hard Disk Drive), which store programs for the CPU's execution of the calculations; and a RAM (Random Access Memory) that serves as a working area during the CPU's execution of the programs.

Figure 3:
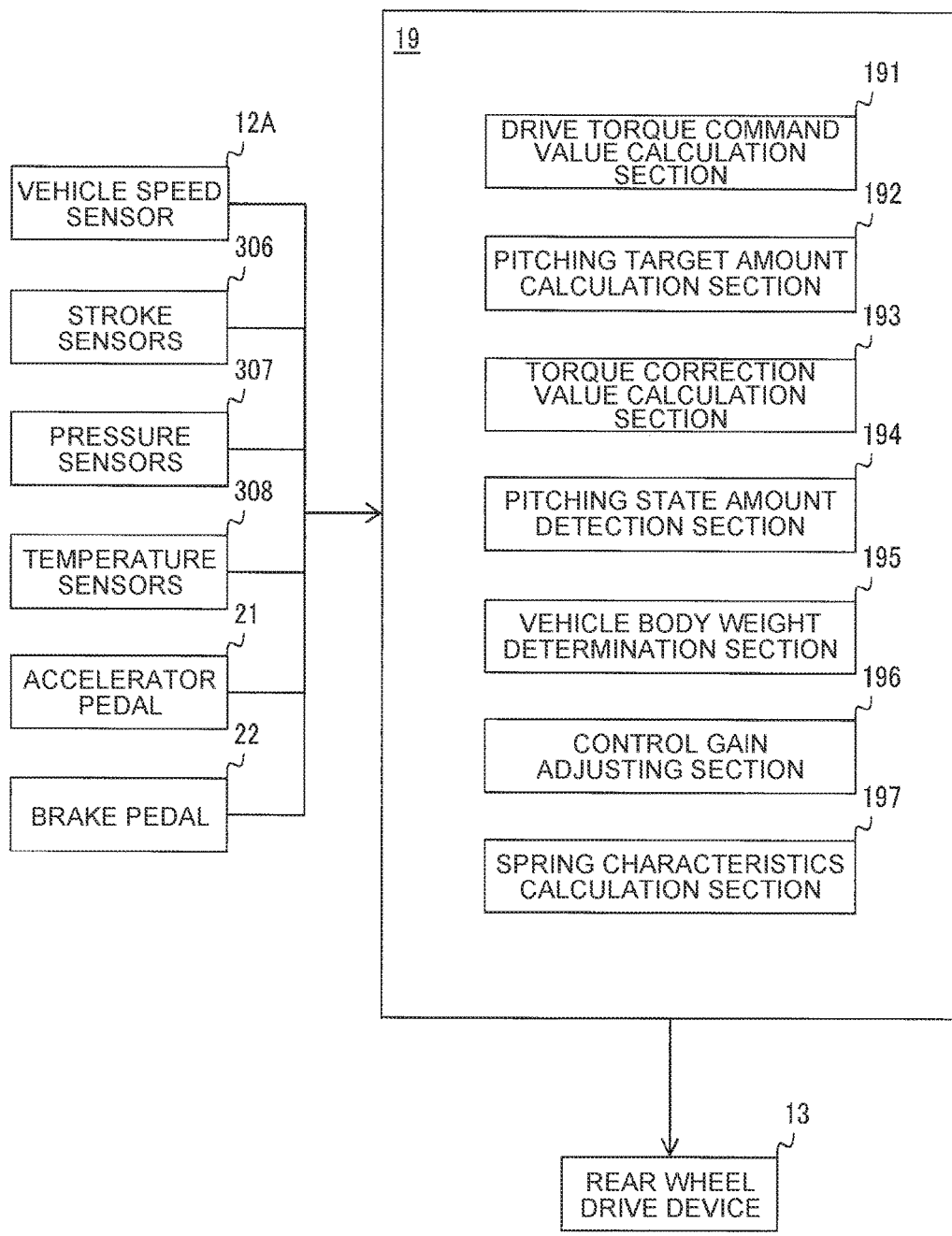
FIG. 3 is a functional block diagram showing main functions of a controller shown in FIG. 1.

In such a hardware configuration, the programs stored in the ROM or HDD or a recording medium, such as an optical disk, not shown, are read into the RAM, and operate according to the CPU's control, thereby allowing the programs (software) and the hardware to cooperate to constitute functional blocks of achieving the functions of the controller 19, as shown in FIG. 3.

More specifically, in view of the functions, the controller 19 includes a drive torque command value calculation section 191, a pitching target amount calculation section 192, a torque correction value calculation section 193, a pitching state amount detection section 194, a vehicle body weight determination section 195, a control gain adjusting section 196, and a spring characteristics calculation section 197. A specific configuration of the pitching control system that includes these configuration elements is described with reference to FIG. 4.

The accelerator pedal 21 and the brake pedal 22 are operation sections for inputting an acceleration request and a deceleration request by an operator, and are connected to the drive torque command value calculation section 191. The drive torque command value calculation section 191 calculates a required drive torque command value on the basis of the acceleration or deceleration request by the operator. The drive torque command value calculated by the drive torque command value calculation section 191 is input into the rear wheel drive device 13 while being input into the pitching target amount calculation section 192.

The pitching target amount calculation section 192 estimates the acceleration of the vehicle body 10 from the input drive torque command value, and calculates the pitching target amount on the basis of vehicle body parameters that pertain to the travel state of the vehicle body 10 and include the acceleration of the vehicle body 10, the weight of the vehicle body 10, the inertia moment, the gravity center height, and the pitching rigidities of the suspension cylinders 30. The difference between the obtained pitching target amount and the measured actual pitching state amount is calculated, and is input into the torque correction value calculation section 193.

In an opposite manner of that of the pitching target amount calculation section 192, the torque correction value calculation section 193 calculates a drive torque correction value required to correct the pitching amount, from the deviation from the input pitching target amount, on the basis of the vehicle body parameters. Correction with the torque correction value calculated by the torque correction value calculation section 193 is applied to the drive torque command value calculated by the drive torque command value calculation section 191, and the corrected value is input into the rear wheel drive device 13. According to the controller 19 that receives the corrected drive torque command value, the rear wheel drive device 13 drives the motors connected to the rear wheels 12R, which serve as drive wheels.

Figure 4:
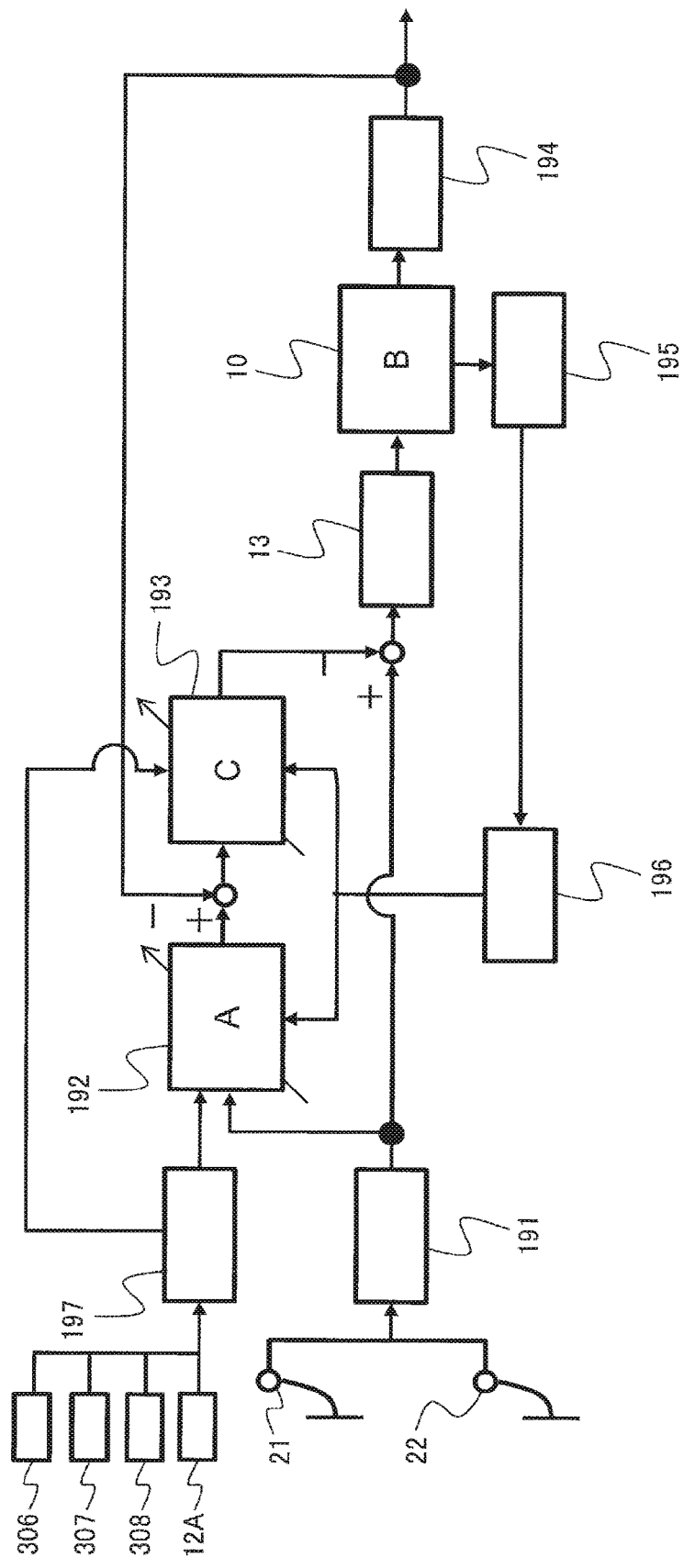
FIG. 4 is an overall view showing a configuration of a pitching control system according to the first embodiment of the present invention.

The vehicle body 10 shown in FIG. 4 indicates a response to an actual pitching movement. The actual pitching state amount of the actual vehicle body 10 is detected by the pitching state amount detection section 194, and is converted into a physical amount usable by the controller 19, for example, a pitching angular displacement or a pitch rate (pitching angular velocity). For example, it can be considered that the pitching state amount detection section 194 performs detection of the attitude of the vehicle body 10 from the difference in height using the stroke sensors 306 of the suspension cylinders 30 of the vehicle body 10, a method of estimating the displacement from loads applied to the suspension cylinders 30 and calculating the attitude of the vehicle body 10, a method of estimating the force input into the vehicle body 10 from the accelerations applied onto the springs of the suspension cylinders 30 and calculating the attitude variation rate of the vehicle body 10 or the like.

For example, in a manner analogous to that of the pitching amount, the vehicle body weight determination section 195 is implemented in the vehicle body 10 according to a method of calculating the wheel loads by calculating the products of the suspension displacements and the spring constants of the suspension cylinders 30 having already been known using the stroke sensors 306 of the suspension cylinders 30 of the vehicle body 10 or the like and of totalizing the loads, and is configured so that this determiner can determine the total weight of the vehicle body 10 that includes the operator in the cab 18 and the loads.

In this case, correctly, the weight of the vehicle body 10 supported by the suspension cylinders 30 is to be detected. That is, the weight does not include the front wheels 12F, the rear wheels 12R, the motors and the like, which are disposed lower than the suspension cylinders 30. Alternatively, the distance between the vehicle body 10 and the ground may be measured, or a strain sensor attached to the vehicle body 10 or the load supporting parts of the suspension cylinders 30 may be used. Thus, the method of determining the weight is not limited.

On the basis of the vehicle body weight information obtained by the vehicle body weight determination section 195, the control gain adjusting section 196 can obtain the pitching target amount and the torque correction value in conformity with the case where the weight of the vehicle body 10 is changed, by appropriately changing and adjusting the coefficients of formulas used for calculating the pitching target amount and the torque correction value in the pitching target amount calculation section 192 and the torque correction value calculation section 193, which have already been described.

The spring characteristics calculation section 197 calculates the spring characteristics of the suspension cylinders 30 on the basis of the strokes of the suspension cylinders 30 detected by the stroke sensors 306, the pressures in the suspension cylinders 30 detected by the pressure sensors 307, and the temperatures in the suspension cylinders 30 detected by the temperature sensors 308. The spring characteristics calculation section 197 can obtain the pitching target amount and the torque correction value that accommodate the dissolution of the gas 301 into the oil 302 in the suspension cylinders 30 by appropriately changing and adjusting the coefficients of formulas used for calculating the pitching target amount and the torque correction value in the pitching target amount calculation section 192 and the torque correction value calculation section 193.

The configuration of the pitching control system of the dump truck 101 according to the first embodiment of the present invention has thus been described above. Hereinafter, the formulation of specific pitching movement, and the processing content of the pitching target amount calculation section 192 and the torque correction value calculation section 193 are described in detail.

Figure 5:
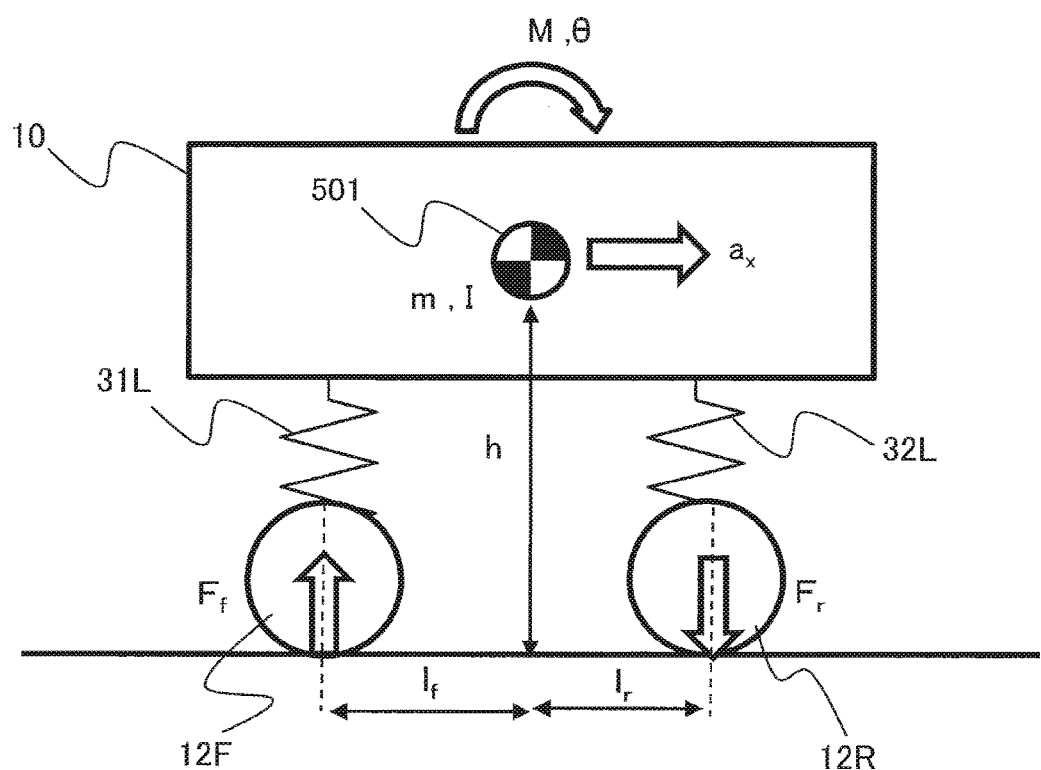
FIG. 5 is a diagram schematically showing the pitching movement of a vehicle body shown in FIG. 1.

FIG. 5 is a diagram schematically showing the pitching movement of the vehicle body 10. In FIG. 5, the vehicle body 10 is joined to the front wheels 12F and the rear wheels 12R in a manner supported by the front wheel suspension cylinders 31L and 31R and the rear wheel suspension cylinders 32L and 32R; the vehicle body 10 is thus supported. It is herein assumed that the weight of the vehicle body 10 is m, the inertia moment in pitching movement is I, the moment of pitching movement is M, and the pitching amount is θ. It is also assumed that the height of the gravity center 501 of the vehicle body 10 above the ground is h, and the distances thereof from the front wheels 12F and the rear wheels 12R are $l_f$ and $l_r$, respectively.

It is assumed that the drive torque command value output from the drive torque command value calculation section 191 is $T_a$ and the tire diameter of the rear wheel 12R is $r_t$, and it is provided that the rear wheels 12R do not slip. In such a case, the acceleration $a_x$ of the vehicle body 10 is represented by the following Formula (1).

[Formula 1]

$$a_x = \frac{T_a}{mr_t} \quad (1)$$

Here, the load movement amounts $F_f$ and $F_r$ of the front wheels 12F and the rear wheels 12R by the acceleration movement of the vehicle body 10 are discussed. The acceleration movements of the gravity center 501, which has the height h above the ground, in the front and rear directions are supported against the ground at points apart by distances $l_f$ and $l_r$ in the front and rear directions. Consequently, the load movement amounts $F_f$ and $F_r$ that are forces applied to the ground at this time are represented by the following Formulas (2) and (3), where the downward direction is assumed to be positive.

[Formula 2]

$$F_f = \frac{-2a_x mh}{l_f + l_r} \quad (2)$$

[Formula 3]

$$F_r = \frac{2a_x mh}{l_f + l_r} \quad (3)$$

The moment M around the gravity center due to the load movement is represented by the following Formula (4) provided that the clockwise direction in FIG. 5 is positive.

[Formula 4]

$$M = -F_f l_f + F_r l_r \quad (4)$$

Formulas (2) and (3) described above are substituted in this Formula (4), and the moment M around the gravity center is represented by Formula (5).

[Formula 5]

$$M = 2mh \cdot a_x \quad (5)$$

In consideration of the static balance, the pitching amount $\theta_s$ at this time is represented by the following Formula (6). Consequently, the pitching target amount by the pitching target amount calculation section 192 may be obtained using Formula (6).

[Formula 6]

$$\theta_s = \frac{M}{K} = \left(\frac{2mh}{K}\right) \cdot a_x \quad (6)$$

Provided herein that the rigidity of each of the front wheel suspension cylinders 31L and 31R is $k_f$ and the rigidity of each of the rear wheel suspension cylinders 32L and 32R is $k_r$, and the clockwise direction in FIG. 5 is positive, K used in Formula (6), which is the pitching rigidity, is expressed by the following Formula (7).

[Formula 7]

$$K = k_f l_f^2 + k_r l_r^2 \quad (7)$$

According to the method described above, the pitching target amount calculation section 192 calculates the pitching target amount, and obtains its difference from the actual pitching state amount detected by the pitching state amount detection section 194. Through the difference, the pitching target amount required to be corrected by control can be calculated.

The torque correction value calculation section 193 is only required to calculate a required acceleration or deceleration $a_c$ from the deviation $\Delta\theta$ of the pitching target amount, and determine a required torque correction value. Here, in brief, Formula (6) may be inversely used for the calculation of the acceleration or deceleration required to correct the pitching movement. More specifically, the calculation can be made by solving Formula (6) for obtaining the pitching amount $\theta_s$ from the acceleration $a_x$ with respect to this acceleration $a_x$. That is, the acceleration or deceleration $a_c$ represented by the following Formula (8) serves as a physical amount required for control.

[Formula 8]

$$a_c = G_k \cdot \left(\frac{K}{2mh}\right) \cdot \Delta\theta \tag{8}$$

Here, $G_k$ is a proportional control gain for the pitching amount. Besides this discussion, in a case where the target of the pitching movement control is regarded as reduction in pitch rate, i.e., pitching angular velocity (pitch rate target value=0), the attenuation of the pitching movement can be controlled by the acceleration or deceleration $a_d$ represented by the following Formula (9) independent of the dynamic characteristics of the system. Here, $\theta'$ is the pitching angular velocity, and $G_d$ is a derivative control gain for the pitching amount.

[Formula 9]

$$a_d = G_d \cdot \theta' \tag{9}$$

According to the above description, the drive torque value in the case of the pitching control obtained by Formulas (8) and (9) is calculated on the basis of the following Formula (10).

[Formula 10]

$$a_{cont} = a_x - a_c - a_d \tag{10}$$

As the torque correction value calculation section 193, a control element that has a transfer function that satisfies the acceleration or deceleration $a_{cont}$ in consideration of the dynamic characteristics of the closed loop system of the entire system is only required to be designed.

Next, the processing content of the spring characteristics calculation section 197 is described in detail.

As represented by the following Formula (11), the spring characteristics of the suspension cylinder 30 is obtained by calculating the compressibility of the gas 301 and the oil 302 enclosed in the suspension cylinder 30. More specifically, the spring characteristics of the suspension cylinder 30 are calculated using the detection results of the stroke sensor 306, the pressure sensor 307 and the temperature sensor 308, while the other parameters are required to be preset. The following Formula (11) represents the relationship between the stroke of the suspension cylinder 30 and the volumes of the gas 301 and the oil 302.

[Formula 11]

$$S_t = \frac{C_0 - \{V_g(P) + V_o(P)\}}{A} \tag{11}$$

The volumes of the gas 301 and the oil 302 are changed by the pressure of the suspension cylinder 30. Consequently, the volumes are represented as functions of the pressure P, such as $V_g(P)$ and $V_o(P)$. In Formula (11), $S_t$ is the stroke of the suspension cylinder 30 (the detected value of by the stroke sensor 306), P is the pressure in the suspension cylinder 30 (the detected value of the pressure sensor 307), $C_0$ is the entire volume of the suspension cylinder 30, $V_g(P)$ is the volume of the gas 301, $V_o(P)$ is the volume of the oil 302, and A is a pressure receiving area of the piston 305.

Meanwhile, the relationship formula among the volume $V_g(P)$ of the gas 301, the pressure P and the temperature t in the suspension cylinder 30, and the relationship formula among the voltage $V_o(P)$ of the oil 302, the pressure P and the temperature t in the suspension cylinder 30 are represented by the following formulas (12) and (13), respectively. That is, the volume $V_g(P)$ of the gas 301 is obtained by solving the equation of state of the gas 301, and the volume $V_o(P)$ of the oil 302 is obtained by calculating the volume on the basis of the preset compressibility and thermal expansion of the oil 302.

[Formula 12]

$$V_g(P) = \frac{P_c V_{gc}}{P} \cdot \frac{t + 273}{t_c + 273} \tag{12}$$

[Formula 13]

$$V_o(P) = \{1 - (P - P_{atm})\beta\}V_{oc} \cdot \frac{1 + \gamma t}{1 + \gamma t_c} \tag{13}$$

Here, $P_c$ is the gas charge pressure of the gas 301 in the most elongated state of the suspension cylinder 30, i.e., the pressure of the gas 301 in the state where no compression load is applied to the suspension cylinder 30, $P_{atm}$ is the atmospheric pressure, $V_{gc}$ is a gas charge volume (the entire volume of the suspension cylinder 30—the oil charge volume), $V_{oc}$ is the oil charge volume, $\beta$ is the compressibility of the oil 302, $\gamma$ is the thermal expansion of the oil 302, t is the temperature in the suspension cylinder 30 (the detected value of the temperature sensor 308), and $t_c$ is the temperature in the suspension cylinder 30 during charging (the detected value of the temperature sensor 308 during charging). The relational Formula between the stroke $S_t$ and the pressure P of the suspension cylinder 30 is obtained by substituting the above-described Formulas (12) and (13) into Formula (11).

To measure directly the gas charge pressure $P_c$ using the pressure sensors 307, the suspension cylinders 30 are required to be brought into the most elongated state by jacking up the vehicle body 10 or the like. This operation requires considerable troubles and time. Possible occurrence of a phenomenon that the gas 301 is dissolved into the oil 302 reduces the gas charge pressure $P_c$ from the pressure achieved when the suspension cylinder 30 is initially charged.

Accordingly, change in gas charge pressure $P_c$, in turn, changes the spring characteristics of the suspension cylinder 30. According to the first embodiment of the present invention, in order to calculate the spring characteristics of the suspension cylinder 30, first, the spring characteristics calculation section 197 obtains the stroke $S_t$, the pressure P and the temperature t of the suspension cylinder 30 in a motionless state of the vehicle body 10 through the stroke sensor 306, the pressure sensor 307 and the temperature sensor 308, respectively, and substitutes these parameters into the following Formula (14), thus calculating the gas charge pressure $P_c$ using this Formula (14), which holds in the motionless state of the vehicle body 10.

[Formula 14]

$$P_c = \left(\frac{P}{C_0 - V_{oc}} \cdot \frac{t_c + 273}{t + 273}\right) \cdot \left[C_0 - S_t A - \{1 - (P - P_{atm})\beta\}V_{oc} \cdot \frac{1 + \gamma t}{1 + \gamma t_c}\right] \quad (14)$$

Figure 6:
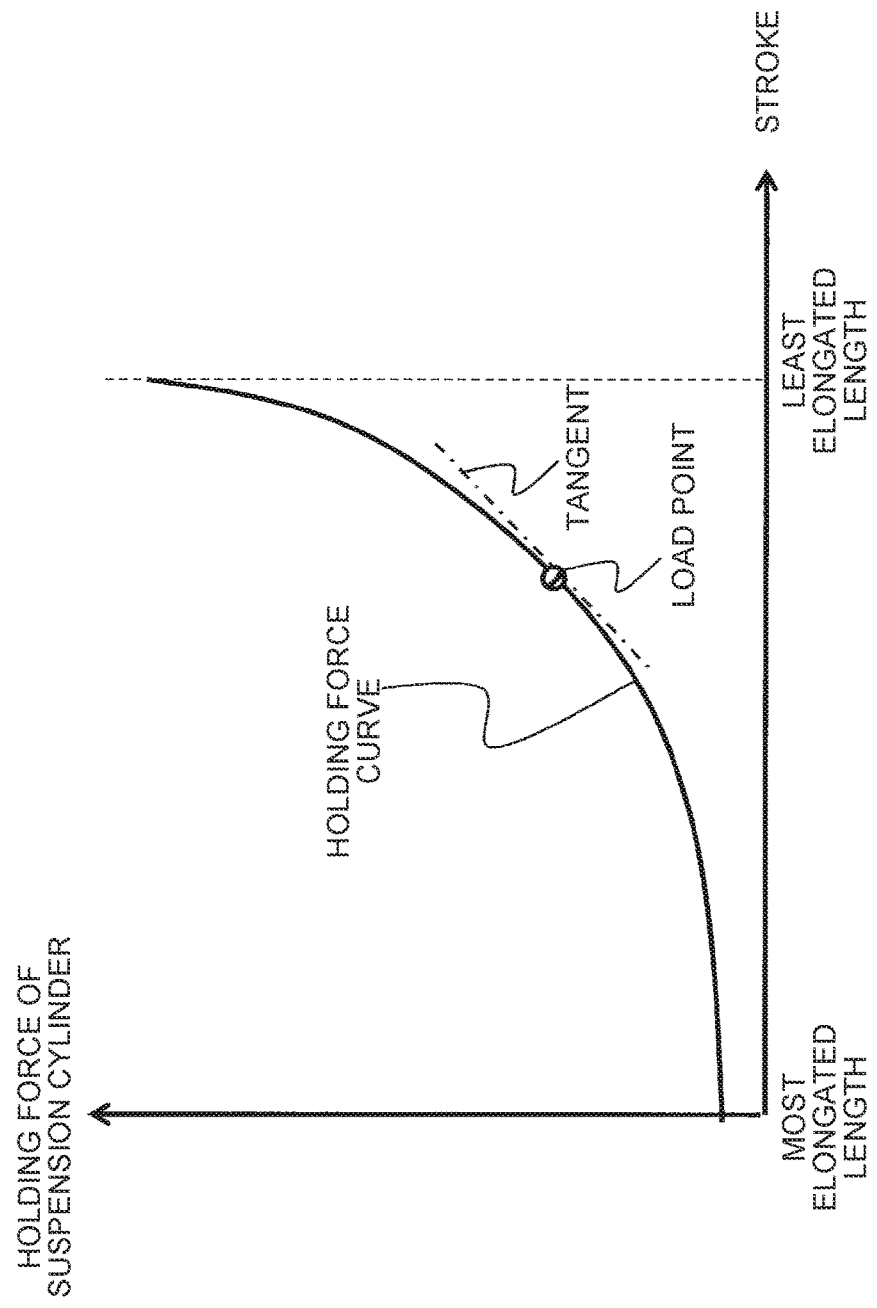
FIG. 6 is a diagram showing the spring characteristics of the suspension cylinder shown in FIG. 1.

Subsequently, the spring characteristics calculation section 197 substitutes the thus calculated gas charge pressure $P_c$ into Formula (12), and further substitutes this Formula (12) and Formula (13) into Formula (11), thereby calculating the relationship between the stroke $S_t$ and the pressure P of the suspension cylinder 30 in the case where the gas 301 is dissolved in the oil 302. As shown in FIG. 6, on the basis of this relationship, the spring characteristics calculation section 197 can obtain the relationship between the holding force and the stroke $S_t$ of the suspension cylinder 30, that is, the spring characteristics of the suspension cylinder 30.

The spring characteristics of the suspension cylinder 30 correspond to the slope of the tangent at a load point indicated in FIG. 6. Consequently, the spring characteristics calculation section 197 can obtain the spring constant of the suspension cylinder 30 by calculating the slope of the tangent at the detected value of the stroke sensor 306 on a holding force curve indicated by the obtained spring characteristics of the suspension cylinder 30. In such a manner, the spring characteristics calculation section 197 calculates the spring constants $k_{fl}$ and $k_{fr}$ of the front wheel suspension cylinders 31L and 31R and the spring constants $k_{rl}$ and $k_{rr}$ of the rear wheel suspension cylinders 32L and 32R, and substitutes the sums of the spring constants $k_f (=k_{fl}+k_{fr})$ and $k_r (=k_{rl}+k_{rr})$ into Formula (7), thus calculating the pitching rigidity K.

Next, a control process of the pitching movement of the vehicle body 10 by the controller 19 according to the first embodiment of the present invention is described in detail with reference to a flowchart of FIG. 7.

Figure 7:
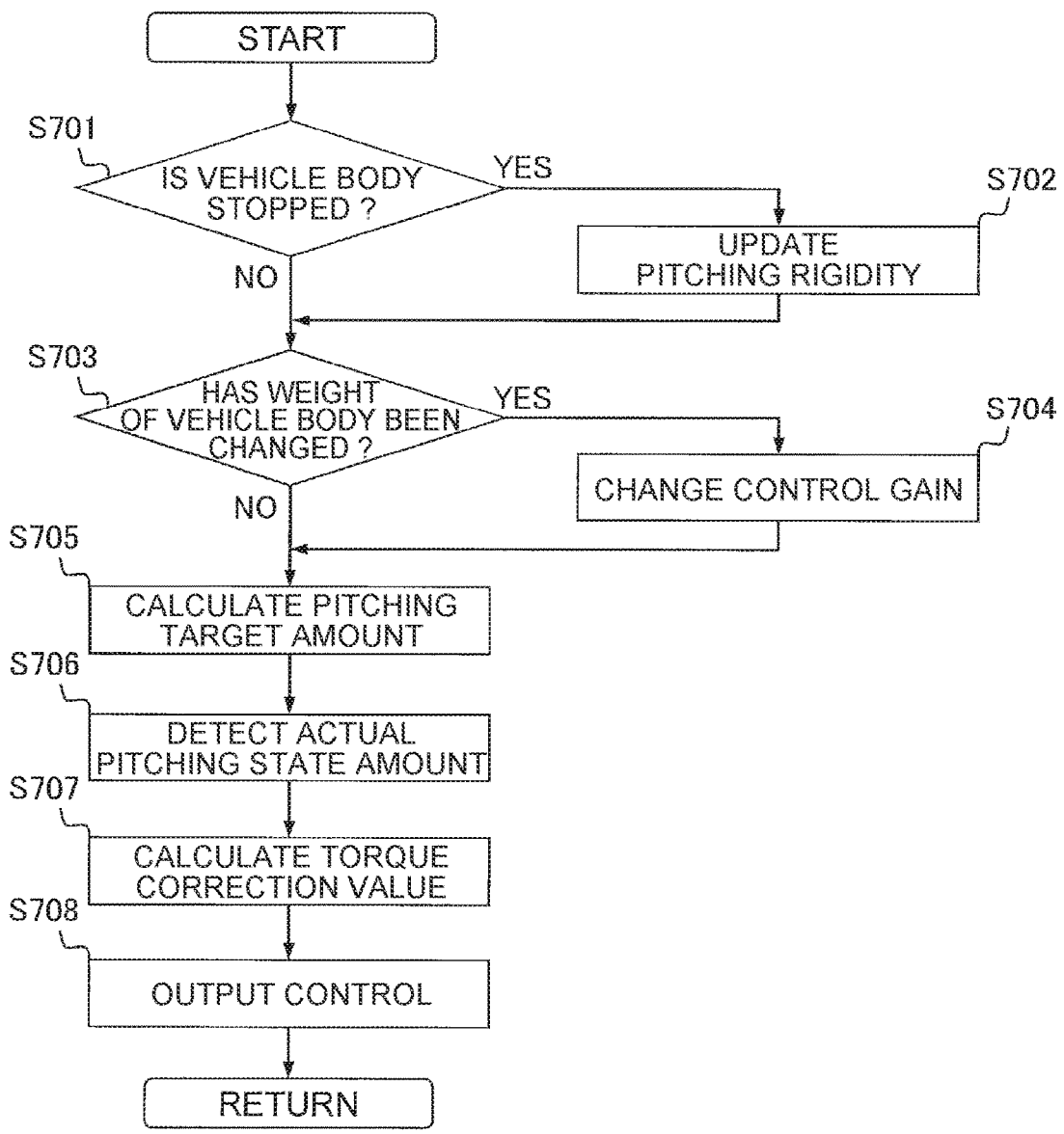
FIG. 7 is a flowchart showing the flow of a control process of the pitching movement of the vehicle body by the controller shown in FIG. 1.

As shown in FIG. 7, first, the controller 19 determines whether or not the vehicle body 10 is stopped or not on the basis of the speed of the vehicle body 10 detected by the vehicle speed sensor 12A (step (hereinafter represented as S) 701). At this time, if the controller 19 determines that the vehicle body 10 is not stopped (S701/NO), a process of S703 described later is performed.

On the contrary, in S701, if the controller 19 determines that the vehicle body 10 is stopped (S701/YES), the spring characteristics calculation section 197 of the controller 19 calculates the spring constant of the suspension cylinder 30 from the detection results of the stroke sensor 306, the pressure sensor 307 and the temperature sensor 308, and obtains the pitching rigidity K from the spring constant, thereby inputting the pitching rigidity K into the pitching target amount calculation section 192 and the torque correction value calculation section 193 to update the input value to the latest value (S702).

Next, the vehicle body weight determination section 195 of the controller 19 determines whether the weight of the vehicle body 10 has been changed or not (S703). At this time, if the vehicle body weight determination section 195 determines that the weight of the vehicle body 10 has not been changed (S703/NO), the process of S705 described later is performed. On the contrary, in S703, if the vehicle body weight determination section 195 determines that the weight of the vehicle body 10 has been changed by change in the laden state of the vessel 14, for example (S703/YES), the control gain adjusting section 196 of the controller 19 changes the control gain (S704).

Next, the pitching target amount calculation section 192 of the controller 19 calculates the pitching target amount on the basis of the drive torque command value calculated by the drive torque command value calculation section 191 from the operation amounts though the accelerator pedal 21 and the brake pedal 22 (S705). The pitching state amount detection section 194 of the controller 19 detects the actual pitching state amount of the vehicle body 10 (S706).

The torque correction value calculation section 193 of the controller 19 calculates the torque correction value from the difference between the pitching target amount calculated by the pitching target amount calculation section 192 and the actual pitching state amount detected by the pitching state amount detection section 194 (S707). Lastly, the controller 19 outputs, to the rear wheel drive device 13, a value obtained by subtracting the torque correction value calculated by the torque correction value calculation section 193 from the drive torque command value calculated by the drive torque command value calculation section 191 (S708), and finishes the control process of the pitching movement of the vehicle body 10 by the controller 19.

According to the pitching control system of the dump truck 101 according to the first embodiment of the present invention having such a configuration, the controller 19 obtains the state amounts of the gas 301 and the oil 302 in the suspension cylinders 30 from the detection results of the stroke sensors 306, the pressure sensors 307 and the temperature sensors 308, which are attached to the suspension cylinders 30, and calculates the spring characteristics of the suspension cylinders 30.

The controller 19 then calculates the pitching rigidity K from the calculated spring characteristics, and calculates the pitching target amount using the pitching rigidity K. This calculation can achieve intended control to the attitude of the vehicle body 10 even if the gas 301 is dissolved into the oil 302 and the temperatures in the suspension cylinders 30 are changed. Accordingly, the ride quality and the drive stability of the vehicle body 10 during traveling can be improved. Furthermore, the vibration damping characteristics of the vehicle body 10 can also be improved. Consequently, the lives of the frame 11 and peripheral devices can be improved.

Second Embodiment

Figure 8:
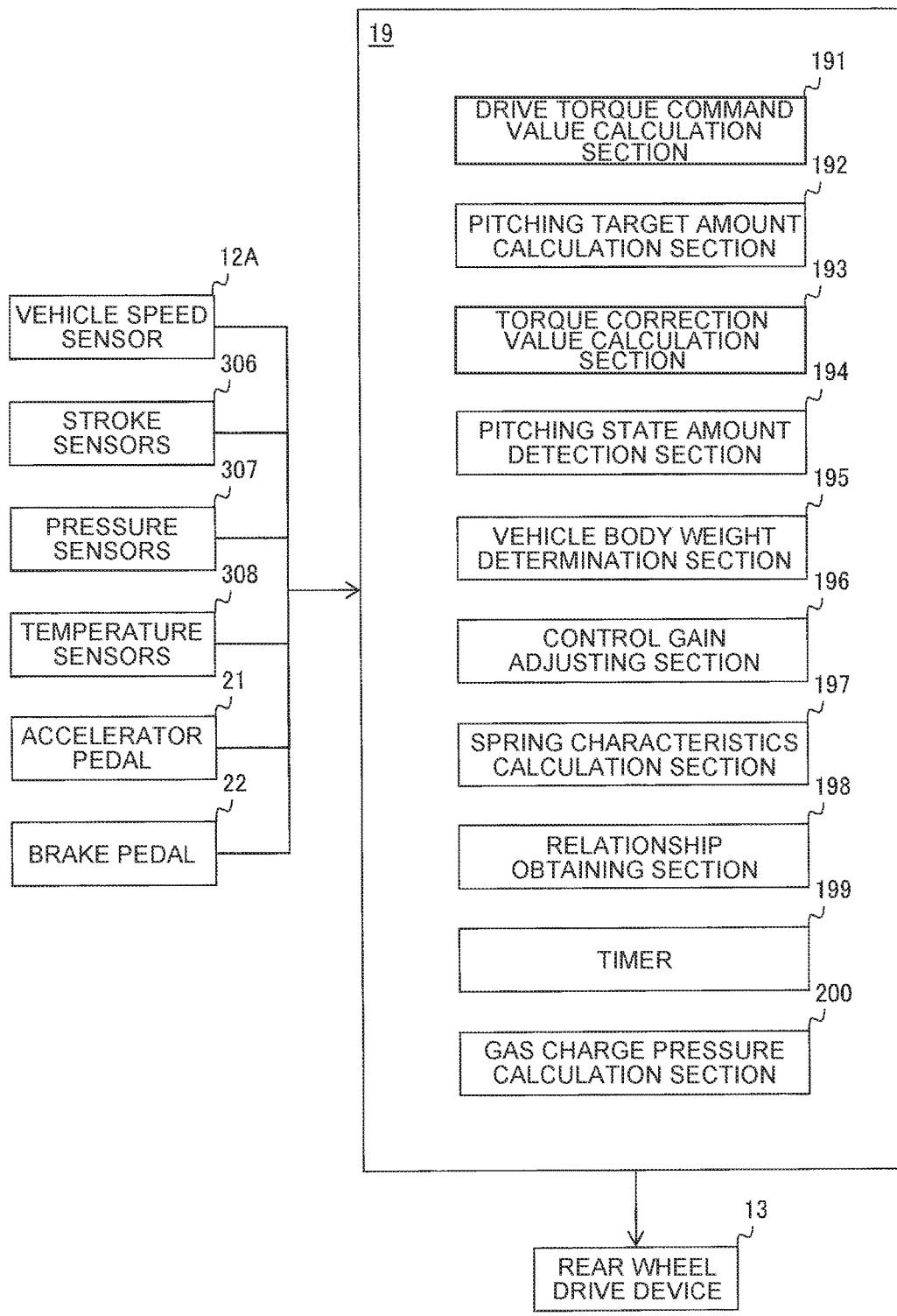
FIG. 8 is a functional block diagram showing main functions of a controller according to a second embodiment of the present invention.
Figure 9:
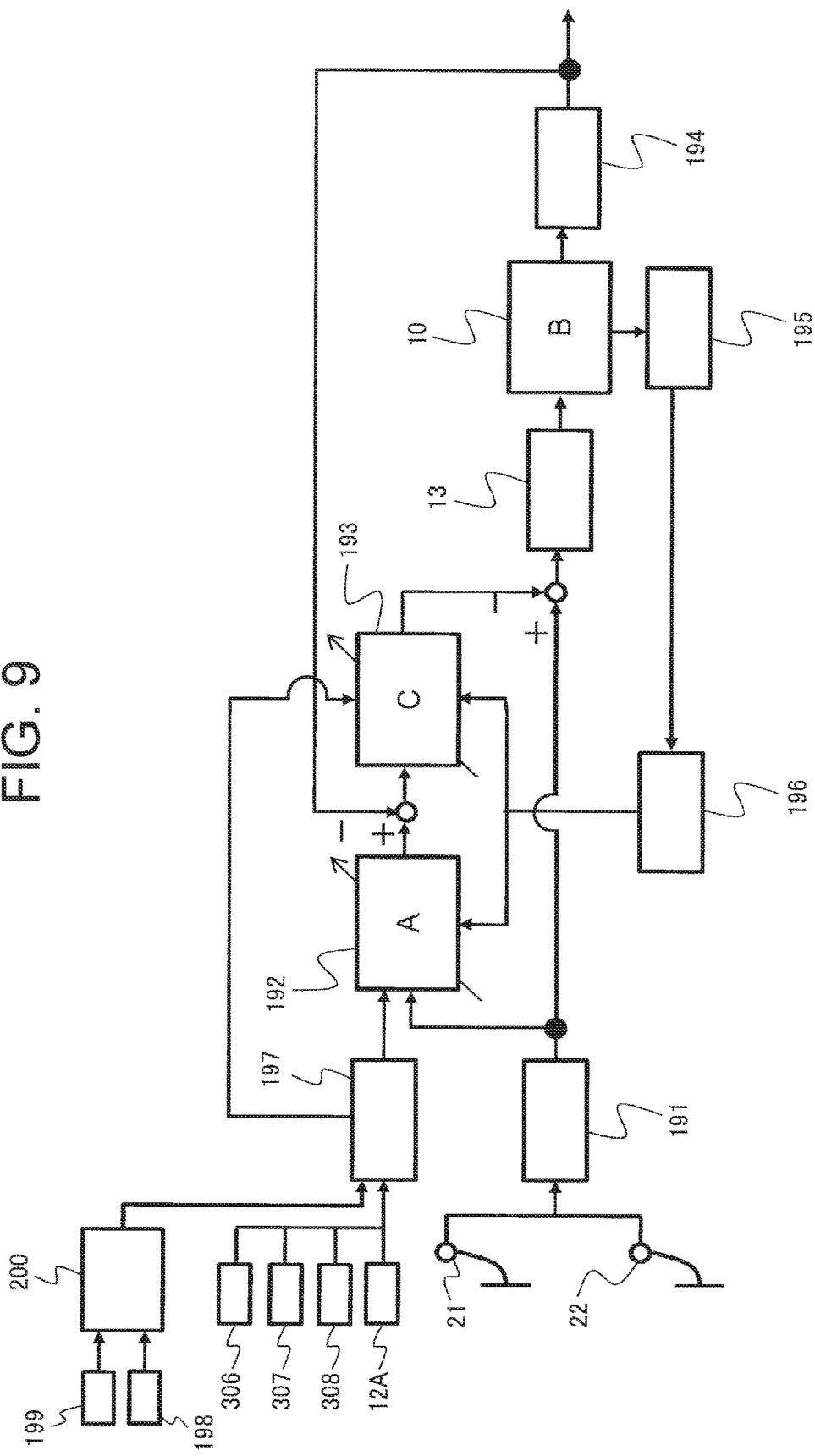
FIG. 9 is an overall view showing a configuration of a pitching control system according to the second embodiment of the present invention.

A pitching control system of a dump truck 101 according to a second embodiment of the present invention includes the configuration of the first embodiment described above, and furthermore, as shown in FIGS. 8 and 9, the controller 19 includes: a relationship obtaining section 198 that obtains the relationship between the gas charge pressure $P_c$ and a travel accumulated time that indicates the accumulation of time during which the vehicle body 10 has traveled after charging of the suspension cylinders 30 with the gas 301 and the oil 302; a timer 199 that measures the travel accumulated time; and a gas charge pressure calculation section 200 that calculates the gas charge pressure $P_c$ by applying the travel accumulated time measured by the timer 199 to the relationship between the gas charge pressure $P_c$ and the travel accumulated time obtained by the relationship obtaining section 198.

The spring characteristics calculation section 197 then calculates the spring characteristics of the suspension cylinders 30 on the basis not only of the detection results of the stroke sensor 306, the pressure sensor 307 and the temperature sensor 308 but also of the calculation result of the gas charge pressure calculation section 200. The other parts of the configuration are the same as those of the second embodiment. The parts overlapping with or corresponding to those of the first embodiment are assigned the same signs. The redundant description is omitted.

According to the second embodiment of the present invention, the relationship obtaining section 198 includes a database that stores the relationship between the gas charge pressure $P_c$ and the travel accumulated time; this pressure decreases as the time elapses, owing to dissolution of the gas 301 into the oil 302 in the suspension cylinders 30, as shown in FIG. 10.

The timer 199 measures, accumulates and displays the time only during a duration of traveling of the vehicle body 10 after the suspension cylinders 30 being charged with the gas 301 and the oil 302, and is made up of an hour meter that indicates the travel accumulated time, for example. The gas charge pressure calculation section 200 calculates the gas charge pressure $P_c$ on the basis of the relationship between the gas charge pressure $P_c$ and the travel accumulated time obtained by the relationship obtaining section 198 and of the travel accumulated time measured by the timer 199.

The spring characteristics calculation section 197 can obtain the spring characteristics of the suspension cylinders 30 using the gas charge pressures $P_c$ calculated by the gas charge pressure calculation section 200, instead of Formula (14), in a manner analogous to that of the first embodiment. A saturation completion time $T_e$ shown in FIG. 7 indicates a time from the suspension cylinder 30 being charged with the gas 301 and the oil 302 to saturation of dissolution of the gas 301 into the oil 302. The saturation pressure $P_e$ indicates the gas charge pressure $P_c$ after saturation of dissolution of the gas 301 into the oil 302.

The pitching control system of the dump truck 101 according to the second embodiment of the present invention having such a configuration can achieve working effects analogous to those of the first embodiment described above. Furthermore, the spring characteristics calculation section 197 can facilitate the calculation of the spring characteristics of the suspension cylinders 30 using the gas charge pressure $P_c$ calculated by the gas charge pressure calculation section 200, instead of Formula (14). This facilitation can alleviate the calculation load on the controller 19. Consequently, the control process of the pitching movement of the vehicle body 10 by the controller 19 can be efficiently performed.

Third Embodiment

In the first embodiment of the present invention described above, the case has been described where the spring characteristics calculation section 197 calculates the spring constants $k_{fl}$ and $k_{fr}$ of the front wheel suspension cylinders 31L and 31R and the spring constants $k_{rl}$ and $k_{rr}$ of the rear wheel suspension cylinders 32L and 32R from the spring characteristics of the suspension cylinders 30 shown in FIG. 6 and calculates the pitching rigidity K.

According to a third embodiment of present invention, the spring characteristics calculation section 197 calculates the spring constants $k_{fl}$ and $k_{fr}$ of the front wheel suspension cylinders 31L and 31R from the spring characteristics of the suspension cylinders 30 shown in FIG. 6, and calculates the pitching rigidity K, using these spring constants $k_{fl}$ and $k_{fr}$ of the front wheel suspension cylinders 31L and 31R, and the spring constants $k_{rl}$ and $k_{rr}$ of the rear wheel suspension cylinders 32L and 32R preset by an experiment or the like. The pitching control system of the dump truck 101 according to the third embodiment of the present invention having such a configuration can also achieve the working effects analogous to those of the first embodiment described above.

The embodiments described above have been described in detail for illustrating the present invention in an easily understandable manner. The present invention is not necessarily limited to what has the entire configuration described above. A part of the configuration of a certain embodiment can be replaced with a configuration element of another embodiment. The configuration of a certain embodiment can additionally include a configuration element of another embodiment.

REFERENCE SIGNS LIST

10 . . . Vehicle body, 11 . . . Frame, 12A . . . Vehicle speed sensor, 12F . . . Front wheel, 12R . . . Rear wheel, 13 . . . Rear wheel drive device, 14 . . . Vessel, 19 . . . Controller, 21 . . . Accelerator pedal, 22 . . . Brake pedal, 30 . . . Suspension cylinder, 31L and 31R . . . Front wheel suspension cylinders (front wheel suspensions), 32L and 32R . . . Rear wheel suspension cylinders (rear wheel suspensions)

101 . . . Dump truck, 191 . . . Drive torque command value calculation section, 192 . . . Pitching target amount calculation section, 193 . . . Torque correction value calculation section, 194 . . . Pitching state amount detection section, 195 . . . Vehicle body weight determination section, 196 . . . Control gain adjusting section, 197 . . . Spring characteristics calculation section, 198 . . . Relationship obtaining section, 199 . . . Timer, 200 . . . Gas charge pressure calculation section 301 . . . Gas, 302 . . . Oil, 306 . . . Stroke sensor, 307 . . . Pressure sensor, 308 . . . Temperature sensor

The invention claimed is:

1. A dump truck pitching control system applied to a dump truck including: a rear wheel drive device including at least one motor; and four suspensions including four suspension cylinders in which gas and oil are enclosed and which alleviate shocks to a vehicle body during traveling and couple front, rear, left and right wheels to the vehicle body, the system controlling a pitching movement of the vehicle body, and comprising:

a pitching state amount detection section that detects a state amount of the pitching movement of the vehicle body;

stroke sensors that detect strokes of the suspension cylinders;

pressure sensors that detect pressures in the suspension cylinders;

temperature sensors that detect temperatures in the suspension cylinders;

a spring characteristics calculation section that calculates spring characteristics of the suspension cylinders, based on detection results of the stroke sensors, the pressure sensors, and the temperature sensors;

a pitching target amount calculation section that calculates a target amount of the pitching movement of the vehicle body, according to the spring characteristics calculated by the spring characteristics calculation section; and a torque correction value calculation section that calculates a torque correction value required to correct the pitching amount, according to the spring characteristics calculated by the spring characteristics calculation section, wherein the torque correction value calculation section calculates the torque correction value according to a difference between a state amount of the pitching movement of the vehicle body detected by the pitching state amount detection section and the target amount of the pitching movement of the vehicle body calculated by the pitching target amount calculation section, and outputs the calculated torque correction value, and the rear wheel drive device receives an output of the torque correction value calculation section, and increases and reduces a drive torque.

2. The dump truck pitching control system, according to claim 1, further comprising:
   a relationship obtaining section that obtains a relationship between a gas charge pressure that indicates a pressure of the gas in a most elongated state of each of the suspension cylinders and a travel accumulated time that indicates an accumulation of time in which the vehicle body travels after the suspension cylinders are charged with the gas and the oil;
   a timer that measures the travel accumulated time; and
   a gas charge pressure calculation section that calculates the gas charge pressure by applying the travel accumulated time measured by the timer to the relationship obtained by the relationship obtaining section,
   wherein the spring characteristics calculation section calculates the spring characteristics, based not only on the detection results of the stroke sensors, the pressure sensors and the temperature sensors but also on a calculation result of the gas charge pressure calculation section.

3. The dump truck pitching control system, according to claim 1,
   wherein among the four suspensions, two front wheel suspensions that connect the front wheels to the vehicle body include two front wheel suspension cylinders disposed on a front side of the vehicle body, and
   the spring characteristics calculation section calculates the spring characteristics, using the detection results of the stroke sensors, the pressure sensors and the temperature sensors with respect to the front wheel suspension cylinders.

* * * * *